United States Patent
Brunet et al.

(10) Patent No.: US 9,927,910 B2
(45) Date of Patent: Mar. 27, 2018

(54) SUSPENSION OF TOUCH SENSOR SCAN BASED ON AN EXPECTED INTERFERENCE

(71) Applicant: Atmel Corporation, San Jose, CA (US)

(72) Inventors: Samuel Brunet, North Boarhunt (GB); Grahame Reynolds, Southampton (GB); Hammad Syed, Slough (GB)

(73) Assignee: Atmel Corporation, Chandler, AZ (US)

( * ) Notice: Subject to any disclaimer, the term of this patent is extended or adjusted under 35 U.S.C. 154(b) by 207 days.

(21) Appl. No.: 14/928,437

(22) Filed: Oct. 30, 2015

(65) Prior Publication Data
US 2017/0123552 A1 May 4, 2017

(51) Int. Cl.
*G06F 3/041* (2006.01)
*G06F 3/044* (2006.01)

(52) U.S. Cl.
CPC .......... *G06F 3/0416* (2013.01); *G06F 3/0418* (2013.01); *G06F 3/044* (2013.01); *G06F 3/0412* (2013.01)

(58) Field of Classification Search
CPC ...... G06F 3/044; G06F 3/0416; G06F 3/0418; G06F 3/0412
USPC ...................... 345/173–174; 178/18.01–18.07
See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,723,824 B2 | 5/2014 | Myers | |
| 2008/0309635 A1 | 12/2008 | Matsuo | |
| 2009/0315854 A1 | 12/2009 | Matsuo | |
| 2011/0254802 A1 | 10/2011 | Philipp | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |
| 2013/0257789 A1* | 10/2013 | Kwon, II | G06F 3/0418 345/174 |
| 2014/0267067 A1 | 9/2014 | Fuller et al. | |
| 2015/0097799 A1* | 4/2015 | Buuck | G06F 3/0418 345/173 |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Rodney Amadiz
(74) *Attorney, Agent, or Firm* — Baker Botts L.L.P.

(57) ABSTRACT

In certain embodiments, a touch sensor controller suspends a scan of a touch sensitive area of a touch sensor for touch events based on an expected interference between the scan and an update of a display screen. After the first time period, touch sensor controller resumes the scan.

16 Claims, 11 Drawing Sheets

(56) References Cited

U.S. PATENT DOCUMENTS

2015/0277660 A1\* 10/2015 Yang .................... G06F 3/0418
 345/173

\* cited by examiner

SUSPENSION OF TOUCH SENSOR SCAN BASED ON AN EXPECTED INTERFERENCE

TECHNICAL FIELD

This disclosure generally relates to touch sensors.

BACKGROUND

In certain display-integrated touch sensors, a display screen may overlap with a touch-sensitive area of the touch sensors. The display screen may be subject to noise from the nearby touch sensors (e.g., capacitive touch sensors). This noise is particularly apparent when the display system is updating an area of a display screen that overlaps with the touch-sensitive area that the touch sensor controller is scanning at the same time. In certain situations, this noise may have an undesirable result, such as for example a display flicker.

DESCRIPTION OF EXAMPLE EMBODIMENTS

In certain display-integrated touch sensors, a display screen may overlap with a touch-sensitive area of the touch sensors, in whole or in part. For example, a display screen may be above, below, within, encompassing, or placed in any type of position in relation to the touch-sensitive area such that there is an overlapping area of the display screen and the touch-sensitive area. In particular display-integrated touch sensors, the touch sensor is within the display screen, separate from the display screen, in combination with the display screen, or within a proximity to the display screen as to potentially cause interference to the display screen. The display screen may be subject to noise from nearby touch sensors (e.g., capacitive touch sensors). This noise is particularly apparent when the display system is updating an area of a display screen that overlaps with the touch-sensitive area that the touch sensor controller is scanning at the same time. The noise may degrade the touch controller performance and display screen performance in ways that are undesirable to the end user experience. For example, in certain situations, this noise may result in a display flicker.

Accordingly, aspects of the present disclosure include a method of scanning a touch sensor (e.g., capacitive touch sensor) integrated with a display, such as for example an LCD scanning display (e.g., an active matrix display), that allows touch scanning to be performed at its own touch sensor report rate while the display is being updated with reduced or eliminated degradation of the displayed image quality. Since display degradation often occurs when the touch scanning is performed at the same time and in the same region that the display screen is being updated, the display degradation may be reduced or avoided by implementing an asynchronous touch scanning process by the touch sensor controller that reduces or eliminates performing the scanning of the touch-sensitive area at the same time and in the same region that the display screen is being updated.

The present disclosure may reduce or eliminate the noise associated with the display system updating an area of the display screen that, at an overlapping time, the touch sensor controller is scanning in the touch-sensitive area and allows touch scanning to be performed at its own report rate. As one example, the present disclosure may allow for higher touch report rates than a touch scanning process directly synchronized to display update rates. This, in turn, may improve the user experience.

Figure 1:
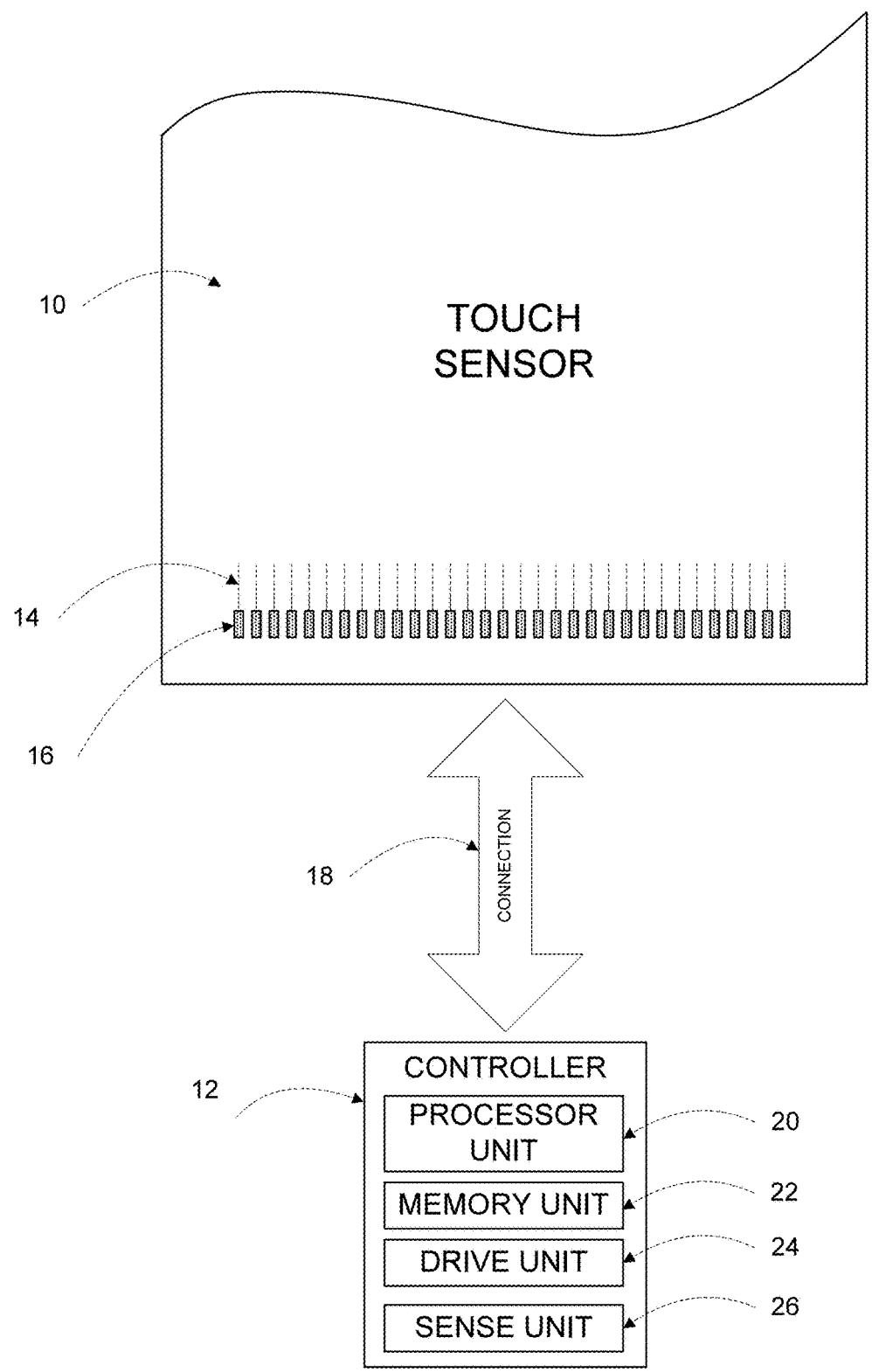
FIG. 1 illustrates an example touch sensor with an example touch sensor controller in accordance with an embodiment.

FIG. 1 illustrates an example touch sensor with an example touch-sensor controller according to certain embodiments of the present disclosure. Touch sensor 10 and touch-sensor controller 12 detect the presence and position of a touch event. A touch event may include a touch or the proximity of an object within a touch-sensitive area of touch sensor 10. Touch sensor 10 and touch-sensor controller 12 may also detect the presence and position of a touch event on, over, or around a touch-sensitive area and may also detect the presence and position of a touch event at the edge of a touch sensor (e.g., edge keys). Reference to the detection of a presence and position of a touch event may include detecting a touch, contact, pressure of the contact, hover, or proximity of an approaching object (e.g., a finger or a stylus). Touch sensor 10 includes one or more touch-sensitive areas. In certain embodiments, touch sensor 10 includes an array of electrodes disposed on one or more substrates, which may be made of a dielectric material.

In certain embodiments, an electrode is an area of conductive material forming a shape, such as for example a disc, square, rectangle, thin line, other shape, or a combination of these shapes. One or more cuts in one or more layers of conductive material may (at least in part) create the shape of an electrode, and the area of the shape may (at least in part) be bounded by those cuts. In certain embodiments, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In certain embodiments, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates electrodes made of any appropriate conductive material forming any appropriate shapes with any appropriate fill percentages having any suitable patterns.

The shapes of the electrodes (or other elements) of a touch sensor 10 constitute, in whole or in part, one or more macro-features of touch sensor 10. One or more characteristics of the implementation of those shapes (such as, for example, the conductive materials, fills, or patterns within the shapes) constitute in whole or in part one or more micro-features of touch sensor 10. One or more macro-features of a touch sensor 10 may determine one or more characteristics of its functionality, and one or more micro-features of touch sensor 10 may determine one or more optical features of touch sensor 10, such as, for example, transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In certain embodiments, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor 10. For example, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the electrodes. The mechanical stack may also include a second layer of OCA and a dielectric layer (which may be made of polyethylene terephthalate (PET) or another suitable material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor 10 and touch-sensor controller 12. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. For example, in certain embodiments, a layer of adhesive or dielectric may replace the dielectric layer, second layer of OCA, and air gap described above, with there being no air gap in the display.

One or more portions of the substrate of touch sensor 10 may be made of PET or another suitable material. This disclosure contemplates any suitable substrate with any suitable portions made of any suitable material. In certain embodiments, one or more electrodes in touch sensor 10 are made of ITO in whole or in part. Additionally or alternatively, one or more electrodes in touch sensor 10 are made of fine lines of metal or other conductive material. For example, one or more portions of the conductive material may be copper or copper-based and have a thickness of approximately 5 microns (μ) or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

In certain embodiments, touch sensor 10 implements a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by touch-sensor controller 12) induces a charge on the sense electrode, and the amount of charge induced is susceptible to external influence (such as, for example, a touch or the proximity of an object). When an object touches or comes within proximity of the capacitive node, a change in capacitance may occur at the capacitive node and touch-sensor controller 12 measures the change in capacitance. By measuring changes in capacitance throughout the array, touch-sensor controller 12 determines the position of the touch or proximity within touch-sensitive area of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 measures the change in capacitance, for example, as a change in the amount of charge implemented to raise the voltage at the capacitive node by a pre-determined amount. As with a mutual-capacitance implementation, by measuring changes in capacitance throughout the array, touch-sensor controller 12 determines the position of the touch or proximity within touch-sensitive area of touch sensor 10. This disclosure contemplates any suitable form of capacitive touch sensing.

In certain embodiments, one or more drive electrodes together form a drive line running horizontally or vertically or in any suitable orientation. Similarly, in certain embodiments, one or more sense electrodes together form a sense line running horizontally or vertically or in any suitable orientation. As one particular example, drive lines run substantially perpendicular to the sense lines. Reference to a drive line may encompass one or more drive electrodes making up the drive line, and vice versa. Reference to a sense line may encompass one or more sense electrodes making up the sense line, and vice versa.

In certain embodiments, touch sensor 10 includes drive and sense electrodes disposed in a pattern on one side of a single substrate. In such a configuration, a pair of drive and sense electrodes capacitively coupled to each other across a space between them form a capacitive node. As an example self-capacitance implementation, electrodes of a single type are disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 detects and processes the change in capacitance to determine the presence and position of the touch or proximity input. In certain embodiments, touch-sensor controller 12 then communicates information about the touch or proximity input to one or more other components (such as, for example, one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

In certain embodiments, touch-sensor controller 12 is implemented as one or more integrated circuits (ICs), such as for example general-purpose microprocessors, microcontrollers, programmable logic devices or arrays, application-specific ICs (ASICs). Touch-sensor controller 12 comprises any suitable combination of analog circuitry, digital logic, and digital non-volatile memory. In certain embodiments, touch-sensor controller 12 is disposed on a flexible printed circuit (FPC) bonded to the substrate of touch sensor 10, as described below. The FPC may be active or passive. In certain embodiments, multiple touch-sensor controllers 12 are disposed on the FPC.

In an example implementation, touch-sensor controller 12 includes processor unit 20, memory unit 22, drive unit 24, and sense unit 26. In such an implementation, drive unit 24 supplies drive signals to the drive electrodes of touch sensor 10, and sense unit 26 senses charge at the capacitive nodes of touch sensor 10 and provides measurement signals to processor unit 20 representing capacitances at the capacitive nodes. Processor unit 20 controls the supply of drive signals to the drive electrodes by drive unit 24 and acquires measurement signals from sense unit 26 to detect and process the presence and position of a touch or proximity input within touch-sensitive area of touch sensor 10. Processor unit 20 may also track changes in the position of a touch or proximity input within touch-sensitive area of touch sensor 10. Memory unit 22 stores programming for execution by processor unit 20, including programming for controlling drive unit 24 to supply drive signals to the drive electrodes, programming for processing measurement signals from sense unit 26, programming for implementing an asynchronous touch scanning process, and other suitable programming. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) touch-sensitive area of touch sensor 10. In certain embodiments, particular tracks 14 provide drive connections for coupling touch-sensor controller 12 to drive electrodes of touch sensor 10, through which drive unit 24 of touch-sensor controller 12 supplies drive signals to the drive electrodes, and other tracks 14 provide sense connections for coupling touch-sensor controller 12 to sense electrodes of touch sensor 10, through which sense unit 26 of touch-sensor controller 12 senses charge at the capacitive nodes of touch sensor 10.

Tracks 14 are made of fine lines of metal or other conductive material. For example, the conductive material of tracks 14 may be copper or copper-based and have a width of approximately 100 μm or less. As another example, the conductive material of tracks 14 may be silver or silver-based and have a width of approximately 100 µm or less. In certain embodiments, tracks 14 are made of ITO in whole or in part in addition or as an alternative to the fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside touch-sensitive area of touch sensor 10. As described above, touch-sensor controller 12 may be on an FPC. Connection pads 16 may be made of the same material as tracks 14 and may be bonded to the FPC using an anisotropic conductive film (ACF). In certain embodiments, connection 18 include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 are connected to an electro-mechanical connector (such as, for example, a zero insertion force wire-to-board connector). Connection 18 may or may not include an FPC. This disclosure contemplates any suitable connection 18 between touch-sensor controller 12 and touch sensor 10.

Figure 2A:
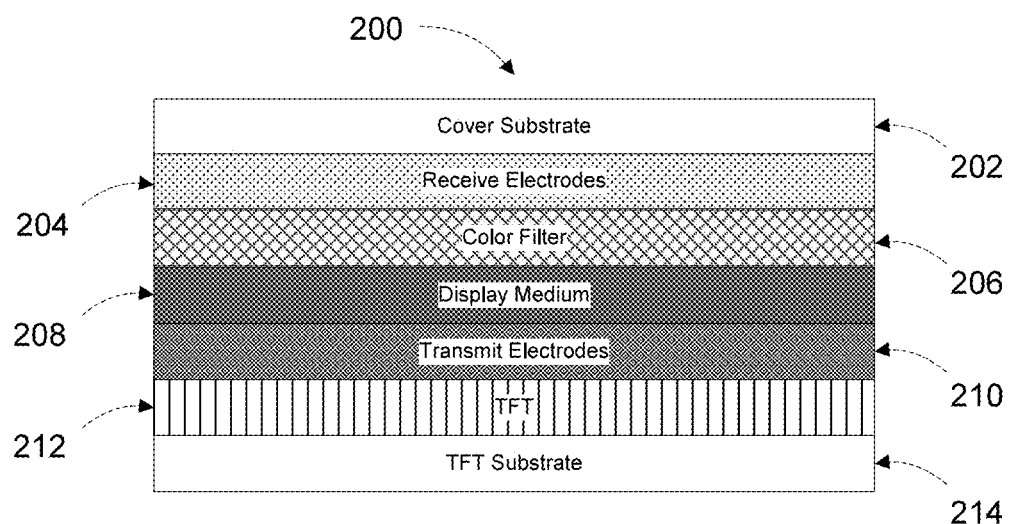
FIGS. 2A-2C illustrate an example display-integrated touch sensor in accordance with an embodiment.
Figure 2B:
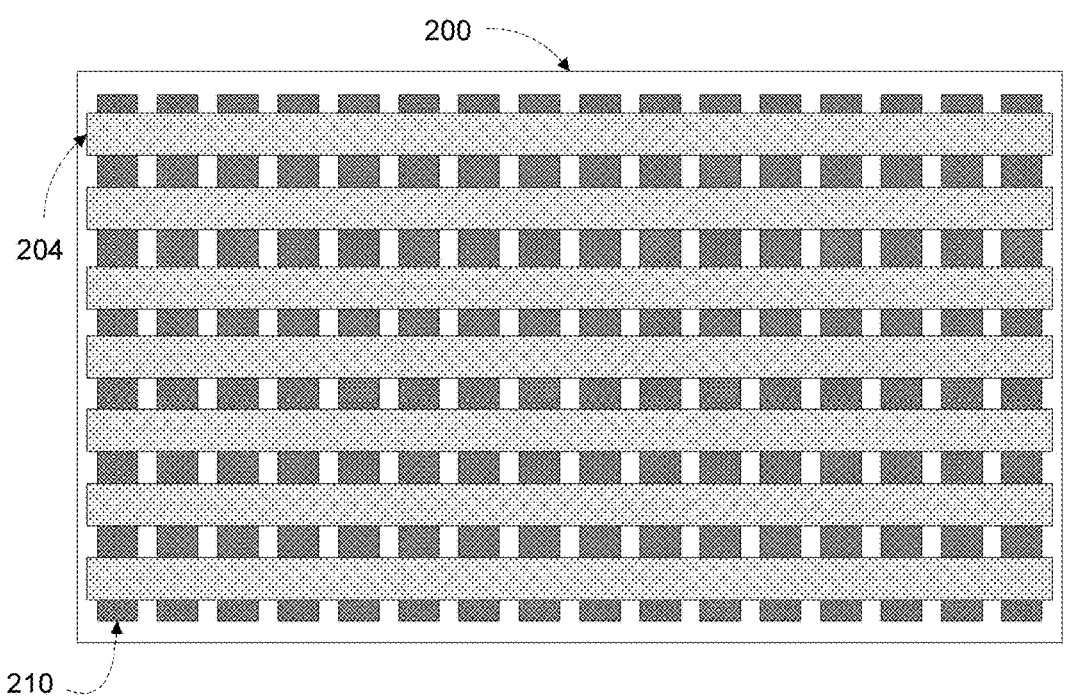
Figure 2C:
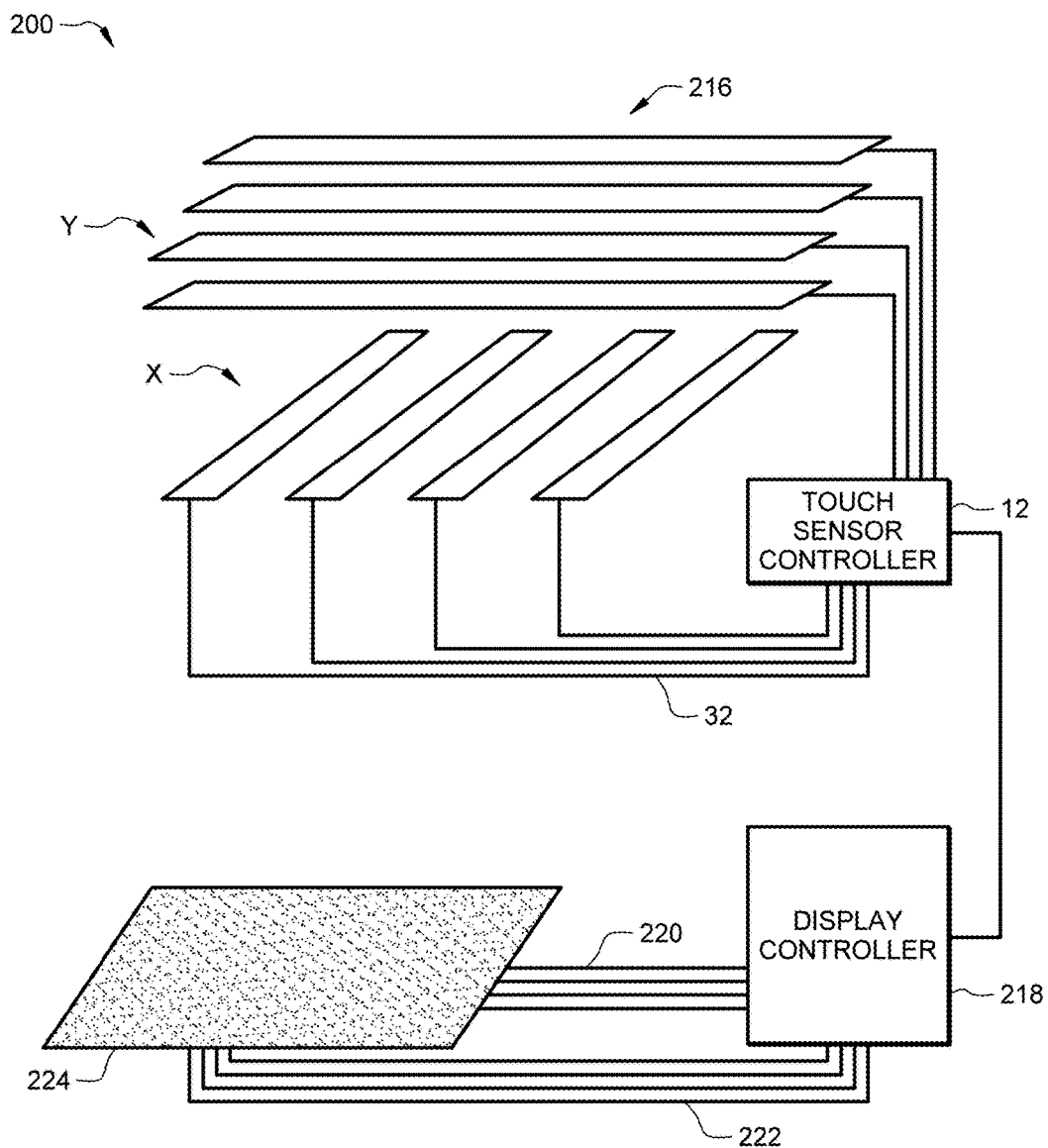

FIGS. 2A-2C illustrate an example display-integrated touch sensor 200. Display-integrated touch sensor 200 is provided as just one example of a display-integrated touch sensor that may be used with the present disclosure. The present disclosure contemplates using other types of display-integrated touch sensor.

FIG. 2A illustrates example layers of display-integrated touch sensor 200. In the illustrated example, display-integrated touch sensor 200 includes a thin film transistor (TFT) substrate 214, TFT layer 212, transmit electrodes 210, display medium 208 (e.g., a liquid crystal display (LCD)), color filter 206, receive electrodes 204, and cover substrate 202 as shown in FIG. 2A. TFT layer 212 may include one or more electronic components (e.g., transistors) suitable for powering and/or controlling display medium 208. In particular embodiments, TFT substrate 214 may be the substrate for both TFT layer 212 and transmit electrodes 210. Similarly, in particular embodiments, cover substrate 202 may be the substrate for receive electrodes 204 and color filter 206, and may comprise glass. Other suitable layers may be added to display-integrated touch sensor 200 or some layers may be removed from display-integrated touch sensor 200 as may be appropriate for particular implementations.

FIGS. 2B and 2C illustrate alternative perspectives of the view shown in FIG. 2A, with the receive electrodes 204 and transmit electrodes 210 intersecting one another, such as for example in a capacitive touch sensor configuration. Although this particular arrangement of receiving electrodes 204 and transmit electrodes 210, the present disclosure contemplates other arrangements of electrodes.

FIG. 2B is a simplified aerial illustration of display-integrated touch sensor 200 of an exemplary touch sensitive display device. In display-integrated touch sensors, the touch scanning components and the display components may share certain electronics. For example, the transmit electrodes 210 may also act as the reference voltage source for the display components (e.g., TFT layer 212) of display-integrated touch sensor 200. However, when activating the touch scanning functions of the display-integrated sensor, a pulse voltage may be applied to the transmit electrodes 210. This additional pulse voltage in the reference voltage of the display circuit may cause display degradation when touch scanning is performed at the same time and in the same region that the display is being updated. Display degradation may be avoided, however, in the potential interference between the display update and the touch sensor scanning by employing an asynchronous touch scanning process that ensures that touch scanning is not performed at the same time and in the same region that the display is being updated, as explained herein.

FIG. 2C illustrates an example display-integrated touch sensor 200. Here, the touch sensor circuitry includes touch sensor controller 12 that is coupled to touch-sensitive area 216. Similarly, the display scanning circuitry includes display controller 218 that is coupled to display screen 224. Display screen 224 can be substantially any type of panel displays, such as for example an electrophoretic display, an LCD, a flat panel display, or a curved panel display. In the illustrated example, touch sensor controller 12 also is coupled to display controller 218.

The touch sensor circuitry may comprise the drive (X) electrodes (e.g., transmit electrodes 210) and sense (Y) electrodes (e.g., receiving electrodes 204) capable of sensing touches to touch-sensitive area 216. The drive electrodes (X) are coupled to touch sensor controller 12 via drive lines, and the sense electrodes (Y) are coupled to touch sensor controller 12 via receive lines. The touch sensor controller 12 permits respective touch channels to be sampled by combinations of drive bursts and receive line enablements creating a signal result for each channel to achieve sensor signal acquisitions for touch scanning for touch events on touch-sensitive area 216. Touch sensor controller 12 may be capable of driving and receiving multiple channels of a row in parallel. A skilled person will appreciate that various implementations of suitable controller may be selected in other examples, such as for example capacitive sensor designs based on self-capacitance. One such implementation may include receiving the drive bursts or excitation from a means of excitation that is not electrical connections. As an example, a touch sensor circuitry may comprise sense electrodes (Y) and also other means than the drive electrodes (X) to provide the drive bursts or excitation.

The display scanning circuitry, on the other hand, includes a display controller 218 provided with circuitry to update display screen 224. In this example, the display scanning circuitry includes a display controller 218 provided with scanning circuitry arranged to drive the row drive lines 220 and the column drive lines 222 that are coupled, respectively, to display screen 224. Display controller 218 has a microcontroller, memory, serial interfaces and display drive circuitry configured to cause the display screen 224 to be updated in a manner such that images are generated on the display.

To update display screen 224, display controller 218 uses horizontal synchronization (HSYNC) and vertical synchronization (VSYNC) signals to control the pixels on the display. The display generally shows a number of frames per second in order to form moving images. Each frame includes a plurality of pixel lines, and each pixel line includes a plurality of pixels. To form an image, display controller 218 receives an image signal that includes data corresponding to a series of pixels. In certain embodiments, display controller 218 implements a vertical blanking (VBLANKING) period where display controller 218 is not updating display screen 224.

To facilitate locating by display controller 218 the position corresponding to each pixel data, display controller 218 uses a HSYNC signal to indicate the start of a pixel line, and a VSYNC signal to indicate the start of a frame. Essentially, the HSYNC and VSYNC signals act as clock signals.

For example, a start of a new pixel line and the start of a new frame can be triggered by the rising edges (e.g., the change from a low level state to a high level state) of the timing pulses of the HSYNC and VSYNC signals. Accordingly, when display controller 218 detects the rising edge of one of the timing pulses of the HSYNC signal, the subsequent pixel data received will be interpreted as belonging to the next pixel line. Display controller 218 will then update that pixel line. Likewise, when display controller 218 detects the rising edge of one of the timing pulses of the VSYNC signal, the subsequent pixel data received will be interpreted as belonging to the next frame. In this manner, image signals can be decoded and displayed correctly in sequence. One of ordinary skill in the art will appreciate that in another embodiment, falling edges of the HSYNC and VSYNC pulses can be used by display controller 106 to initiate a new pixel line and a new frame, respectively.

In the illustrated example, a control signal path connects touch sensor controller 12 and the display controller 218 and is capable of carrying messages and/or signaling between the controllers. Such a control signal path may, for example, be implemented as a serial interface, a bus or the like. Although the example shows discrete display controller 218 and touch sensor controller 12, it is possible for the display controller 218 and the touch sensor controller 12 to be implemented as a single controller, or, alternatively, as distributed circuit components.

In an example embodiment of operation, display controller 218 updates one or more pixel lines based on a received HSYNC signal. In particular, display controller 218 updates display screen 224 by sequentially updating pixel lines from the left-most area of the screen to the right-most area of the screen.

Touch sensor controller 12 is configured to scan one or more drive lines at a touch sensor report rate. In an example embodiment, touch sensor controller 12 is configured to scan one or more drive lines in reverse order than display controller 218 is updating display screen 224. For example, in an update order, display controller 218 sequentially updates pixel lines in the display from the left-most area of the display to the right-most area of the display. In turn, touch sensor controller 12 is configured to scan drive lines from the right-most area of touch-sensitive area 216 to the left-most area of touch-sensitive area 216 in a scanning order. As another example, display controller 218 sequentially updates pixel lines in the display from the right-most area of the display to the left-most area of the display. In turn, touch sensor controller 12 is configured to scan drive lines from the left-most area of touch-sensitive area 216 to the right-most area of touch-sensitive area 216 in a scanning order.

Touch sensor controller 12 is configured to also determine one or more expected interferences between the updating of the pixel lines in the display and the scanning of the drive lines in touch-sensitive area 216. In certain embodiments, touch sensor controller 12 is configured to use certain parameters to determine an expected interference. For example, touch sensor controller 12 is configured to use these parameters to identify an expected interference between an update of an estimated area of display screen 224 by display controller 218 at a first time and a scan of an estimated area of touch-sensitive area 216 by touch sensor controller 12 at the first time. A non-exhaustive list of example parameters that touch sensor controller 12 may use to determine an expected interference are listed below. These parameters may be retrieved from any suitable source, including, but not limited to, the display manufacturer, display controller 218, from testing the display, from the touch sensor manufacturer, from testing the touch sensor, or may be calculated from other parameters received.

| Parameter | Description |
| --- | --- |
| Display Resolution | Total number of pixel lines on the display. In certain embodiments, if display controller 218 updates display screen 224 by using pixel rows (pixel lines that run vertically), the display resolution of display screen 224 for the rows may be used by touch sensor controller 12 to determine an expected interference. In addition, if display screen 224 does not perfectly overlay touch-sensitive area 216, the total number of pixel lines overlaying touch-sensitive area 216 may be used by touch sensor controller 12 to determine an expected interference. |
| VSYNC Positive Pulse Width | Time for which the VSYNC signal is active or high. |
| Frame Refresh Rate | Display frame refresh rate is generally the VSYNC period. Typically, the VSYNC period is 60 Hz or 120 Hz. |
| HSYNC Period | Time period for an HSYNC signal. |
| VBLANKING Period | Time for which display controller 202 is not updating any pixel line on display screen 224. |
| Pixel lines updated per HSYNC Period | The number of pixel lines that are updated per HSYNC period. Typically, one pixel line is updated per one HSYNC period. |
| Number of HSYNC Periods to Finish an Iteration of Updating the Display | The number of HSYNC periods to occur to finish updating the display for one iteration. In certain embodiments, one or more HSYNC periods to occur during the VBLANKING period. Touch sensor controller 12 can use the HSYNC period and number of HSYNC periods to estimate a time that display controller 218 updates a portion of display screen 214 and also a time when display controller 218 updates a portion of display screen 214. |
| Number of Drive Lines | Total number of drive lines on the touch-sensitive area 216. If touch-sensitive area 216 does not perfectly overlay display screen 224, the total number of drive lines that overlay display screen 224 may be used by touch sensor controller 12 to determine an expected interference. |
| Number of Drive Lines Per Pixel Lines | The number of drive lines that overlay a pixel line. |

Touch sensor controller 12 may use one or more of these parameters to determine an expected interference. For example, touch sensor controller 12 uses the HSYNC period, the number of HSYNC periods to finish an iteration of updating the display, and the VBLANKING time period to calculate the time for each segment of display screen 224 that is being updated by display controller 218. In certain embodiments, touch sensor controller 12 creates an array structure that contains the update start and stop times for each segment of display screen 224.

In certain embodiments, the pulse width for scanning a portion of the touch sensor is dependent on a charge time, inter-line processing time, and processing delays. By providing an interruption time before a touch sensor scan pulse, touch sensor controller 12 may measure the burst time of the touch sensor scan. In certain embodiments, the touch sensor controller 12 inserts dummy touch sensor scans to measure and tune the parameters associated with the display update and touch sensor scan.

Using one or more of these parameters, touch sensor controller 12 is configured to identify an expected interference between the display controller updating an area of the display screen and the touch sensor scanning, at the same time, an area of the touch-sensitive area that overlaps the area of the display screen being updated by the display controller. In particular, touch sensor controller 12 is configured to identify an expected interference between the updating of the pixel lines in display screen 224 and the scanning of the drive lines in touch-sensitive area 216. In certain embodiments, the interference may be identified beforehand such that touch sensor controller 12 suspends scanning the drive for a set time period so as to avoid such interferences. After suspending for the set period of time, touch sensor controller 12 resumes scanning touch-sensitive area 216 from a point at or before the point it last scanned for touch events. The length of the time period of the suspension of scanning may also be adjusted in order to take into account any settling, delays, or latencies of the system.

For example, using one or more parameters (such as, for example, the frame refresh rate), touch sensor controller 12 estimates an area that display controller 218 will update at a first time. Likewise, touch sensor controller 12 estimates an area that touch sensor controller 12 is expected to scan at the first time. By comparing the estimated area that display controller 218 will update and the estimated area that touch sensor controller 12 is expected to scan at the first time, touch sensor controller 12 determines if an expected interference may occur. In an example embodiment, an expected interference may occur when the area that display controller 218 will update at a first time and the area that touch sensor controller 12 is expected to scan at the first time overlaps. In certain embodiments, touch sensor controller 12 identifies an expected interference by comparing the estimated areas that display controller 218 updates and touch sensor controller 12 scans at a particular time and determining that the areas overlap. A collision occurs when display controller 218 updates an area that is overlapping with an area that touch sensor controller 12 is scanning. A collision can cause interference to display screen 218. Accordingly, touch sensor controller 12 can determine an expected interference by identifying expected collisions, and also may avoid an expected interference by suspending the scanning of touch sensor 10 to avoid the expected collision. In certain embodiments, an expected interference also occurs even if the estimated area that the display controller 218 updates and touch sensor controller 218 scans does not overlap. For example, an interference can occur if the areas that display controller 218 updates and touch sensor controller 12 scans at the same time are near to each other and can cause interference to display screen 218. If an expected interference (such as for example an expected interference from display controller 218 updating and touch sensor controller 12 scanning overlapping areas at the same time) is identified, touch sensor controller 12 will suspend scanning touch-sensitive area 216 that would cause the interference for a time period on or before the first time. In an example embodiment, touch sensor controller 12 determines the suspension time period by using the frame refresh rate.

Continuing the example, touch sensor controller 12 determines a potential second interference. Touch sensor controller 12 estimates a second area of the display that display controller 218 will update at a second time. In certain embodiments, the second time occurs after the first time. Touch sensor controller 12 also estimates a second area of the touch-sensitive area that touch sensor controller 12 is expected to scan at the second time. By comparing the estimated second area that display controller 218 will update and that touch sensor controller 12 is expected to scan at the second time, touch sensor controller 12 determines if a second expected interference may occur. If an expected interference may occur, touch sensor controller 12 suspends scanning touch-sensitive area 216 for a second time period on or before the second time. In an example embodiment, touch sensor controller 12 determines the second suspension time period by using the frame refresh rate. In certain embodiments, the second suspension time period is different than the first suspension time period. In particular embodiments, the first and second suspension time period is the same.

In an embodiment, touch sensor controller 12 determines if scanning an area that touch sensor controller 12 will scan at a first time may interfere with the area being updated by display controller 218 at the same first time. If touch sensor controller 12 determines that such scanning may interfere with the area being updated by display controller 218, touch sensor controller 12 suspends scanning for a period of time in order to avoid interfering with the display updates.

In order to avoid at least a portion of the expected interference, touch sensor controller 12 suspends scanning the drive lines in touch-sensitive area 216 for a time period. In certain embodiments, the suspension time period is a set time period and in some it is calculated. In some embodiments, the suspension time period is adaptive. For example, the suspension time period may be based on the amount of time the interference was expected to have occurred.

Typically, during the suspension time period, touch sensor controller 12 suspends any scanning of any portion of touch sensor 10. For instance, touch sensor controller 12 does not drive any of the drive lines 320 during the suspension time period. In certain embodiments, however, during the suspension time period, touch sensor controller 12 does not drive the drive lines 320 in the section of touch-sensitive area 16 that was expected to collide or interfere with the area of display screen 224 that display controller 218 is updating during that time period. In certain embodiments, touch sensor controller 12 scans a portion of touch-sensitive area 216 that does not collide or interfere with the area that display controller 218 is updating during that time period. In an example embodiment, touch sensor controller 12 resumes scanning the portion of the touch sensor 10 that touch sensor controller 12 intended to scan before suspending the scan.

Figure 3:
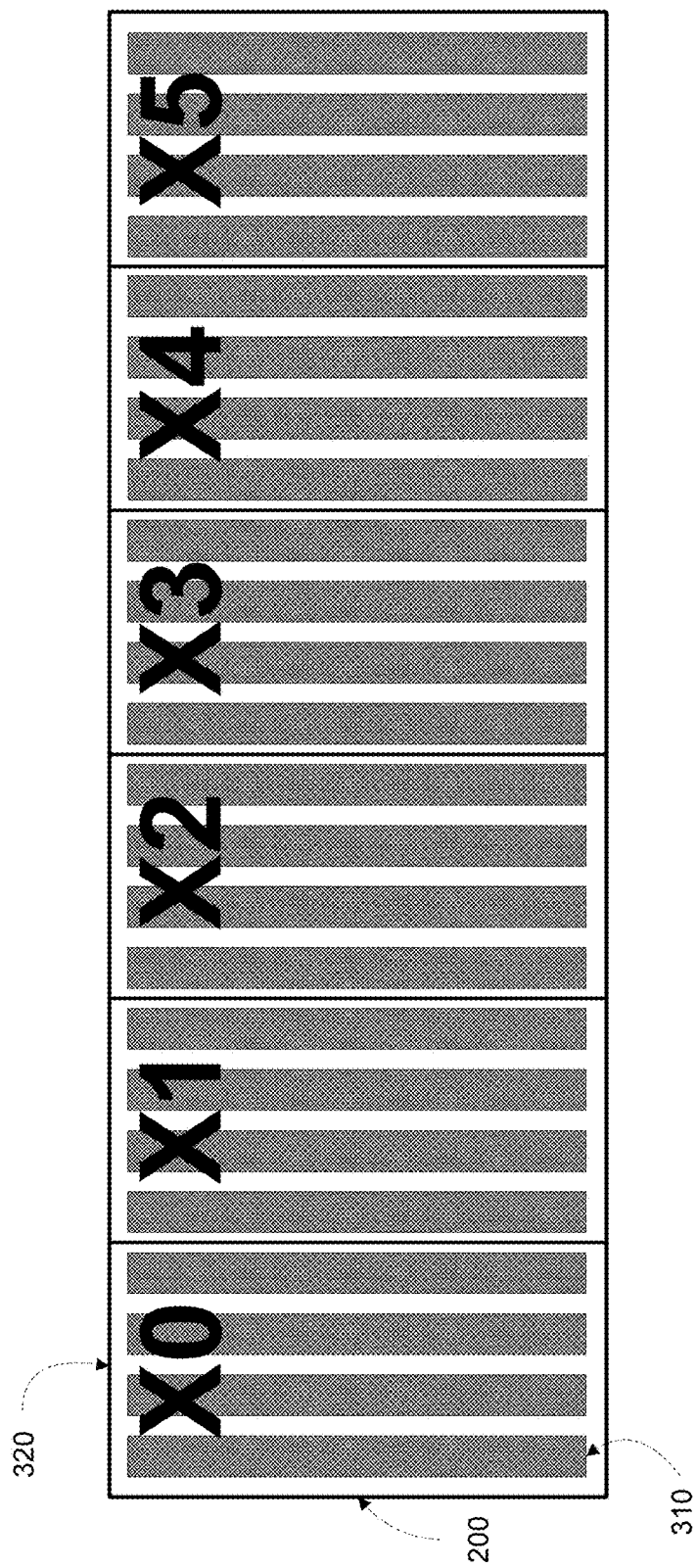
FIG. 3 illustrates an example division of a display-integrated touch sensor in accordance with an embodiment.

FIG. 3 illustrates an example division of display-integrated touch sensor 200. Display-enabled touch sensor 200 may contain one or more pixel lines 310 and one or more drive lines 320. Although pixel line 310 identifies one or more pixel lines in FIG. 3, pixel line 310 may represent any number of pixel lines in display-enabled touch sensor 200. Similarly, although drive line 320 identifies one or more drive lines in FIG. 3, drive line 320 may represent any number of pixel lines in display-enabled touch sensor 200.

Touch-sensitive area 216 may be divided into multiple sections, such that each section (as represented by the indicators X0 to X5) may contain one or more drive lines 320. In the figure, each section contains only one drive line 320. In certain embodiments, touch sensor controller 12 drives one or more drive lines 320 in one section at a particular time. Likewise, display screen 224 may be divided into multiple sections, such that each section is individually updated in separate time periods. Each section in display screen 224 may contain one or more pixel lines 310 per section. In this particular illustration, drive line 320 (such as, for example, the one represented by section X0) contains four pixel lines 30 per drive line 320. In an example embodiment, the multiple sections that compose touch-sensitive area 216 overlay the multiple sections of display screen 224. Although the example shows display screen 224 and touch-sensitive area 216 comprising an equivalent area, it is possible for display screen 224 and touch-sensitive area 216 to comprise different areas. In other words, touch-sensitive area 216 and display screen 224 do not have to overlay each other or be of the same size.

As explained herein, in accordance with an embodiment, touch sensor controller 12 suspends scanning of touch-sensitive area 216 for a time period, such as, for example, to ensure that touch scanning is not performed in the same region and at the same time as the region being updated for display screen 224.

FIGS. 4A-4D illustrate various example scenarios where an interference may occur. The interference, in FIGS. 4A-4D, occur based on the section of display screen 224 being updated overlapping with the touch-sensitive area 216 being scanned. These interferences, if not avoided, may introduce noise to display screen 224. For example, a visual flickering of display screen 224 may occur if an interference occurs between (1) the update of a portion of display screen 224 and (2) the scan of a portion of touch-sensitive area 216.

FIGS. 4A-4D use the indicators X0-X5 to indicate a section of (1) display screen 224 being updated or (2) touch-sensitive area 216 being scanned. Indicators X0-X5 correspond to the sections X0-X5 in FIG. 3. As indicated in the graph axes in FIGS. 4A-4D, the X-axis indicates time, and the length of the boxes indicates the time period that the respective section of (1) display screen 224 is being updated or (2) touch-sensitive area 216 is being scanned, as labeled respectively. The Y-axis indicates whether the corresponding box indicates that the box is indicating that the section of (1) display screen 224 is being updated or (2) touch-sensitive area 216 is being scanned. Although FIGS. 4A-4D illustrate an example embodiment wherein touch sensor controller 12 scans the sections in touch-sensitive area 216 in an order that is reverse to the order that display controller updates the sections in display screen 224, it is noted that the present technology is not limited to the implementation of this reverse order.

In certain embodiments, touch sensor controller 12 estimates which section of display screen 224 will be updated and which section of touch-sensitive area 216 will be scanned during a particular time by using one or more parameters (such as, for example, the frame refresh rate). In certain embodiments, memory unit 22 stores these parameters. By which section of display screen 224 will be updated and which section of touch-sensitive area 216 will be scanned respectively during a particular time, touch sensor controller 12 can determine whether a potential interference between display screen 224 and touch-sensitive area 216 is expected to occur.

Figure 4A:
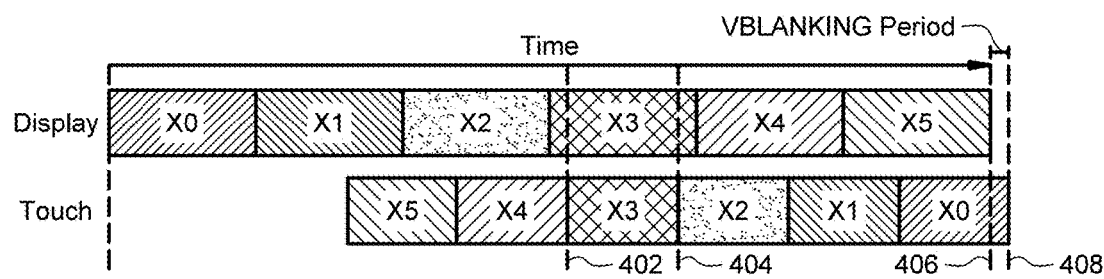
FIG. 4A illustrates an example scenario of an expected interference where the touch sensor controller starts the scan of the touch-sensitive area after display controller starts the update of display screen and the touch sensor controller completes a scan of the touch-sensitive area at the same time that display controller completes an iteration of updating display screen in accordance with an embodiment.

FIG. 4A illustrates an example scenario of an expected interference where (1) touch sensor controller 12 starts the scan of touch-sensitive area 216 after display controller 218 starts the update of display screen 224 and (2) the touch sensor controller 12 completes a scan of touch-sensitive area 216 at the same time that display controller 218 finishes an iteration of updating display screen 224. Specifically, in the illustration of FIG. 4A, touch sensor controller 12 completes the scan of touch-sensitive area 216 as the same time as display controller both completes the scan of display 10 and also the VBLANKING period. The VBLANKING period is illustrated in FIG. 4A as the time period between dashed line 406 and dashed line 408. Accordingly, touch sensor controller 12 completes the scan of touch-sensitive area 216 at the same time that display controller 218 finishes an iteration of updating display screen 224.

In the scenario illustrated in FIG. 4A, an expected interference occurs because touch sensor controller 12 scans section X3 of touch-sensitive area 216 during the same time period that display controller 218 updates section X3 of display screen 224. Specifically, the expected interference occurs between dashed line 402 and dashed line 404.

Figure 4B:
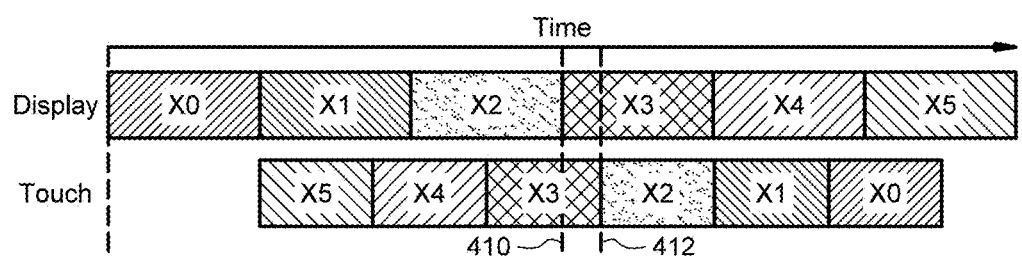
FIG. 4B illustrates an example scenario of an expected interference where the touch sensor controller starts the scan of the touch-sensitive area after the display controller starts the update of display screen and the touch sensor controller completes a scan of touch-sensitive area before the display controller completes an update of the display screen in accordance with an embodiment

FIG. 4B illustrates an example scenario of an expected interference where (1) touch sensor controller 12 starts the scan of touch-sensitive area 216 after display controller 218 starts the update of display screen 224 and (2) the touch sensor controller 12 completes a scan of touch-sensitive area 216 before display controller 218 finishes an update of display screen 224. In the scenario illustrated in FIG. 4B, an expected interference occurs because touch sensor controller 12 scans section X3 of touch-sensitive area 216 during the same time period that display controller 218 updates section X3 of display screen 224. The expected interference corresponds to the time area between dashed line 410 and dashed line 412.

Figure 4C:
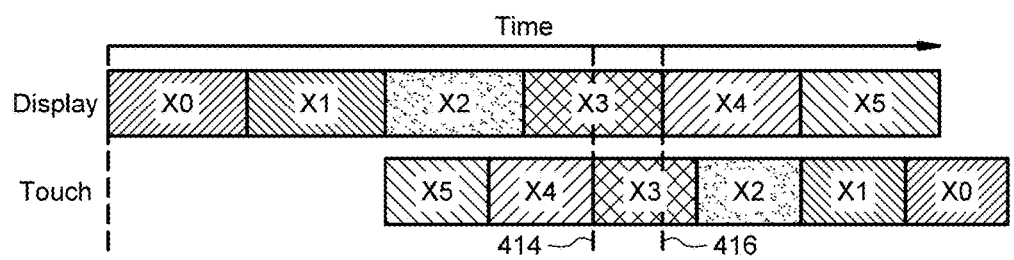
FIG. 4C illustrates an example scenario of an expected interference where the touch sensor controller starts the scan of the touch-sensitive area after the display controller starts the update of the display screen and the touch sensor controller completes a scan of touch-sensitive area after the display controller completes an update of display screen in accordance with an embodiment.

FIG. 4C illustrates an example scenario of an expected interference where (1) touch sensor controller 12 starts the scan of touch-sensitive area 216 after display controller 218 starts the update of display screen 224 and (2) touch sensor controller 12 completes a scan of touch-sensitive area 216 after display controller 218 finishes an update of display screen 224. In the scenario illustrated in FIG. 4C, an expected interference occurs because touch sensor controller 12 scans section X3 of touch-sensitive area 216 during the same time period that display controller 218 updates section X3 of display screen 224. Specifically, the expected interference occurs between dashed line 414 and dashed line 416.

In addition, because touch sensor controller 12 completes a scan of touch-sensitive area 216 after display controller 218 finishes an update of display screen 224, an expected interference may occur if display controller 218 starts another iteration of updating display screen 224 at section X0.

Figure 4D:
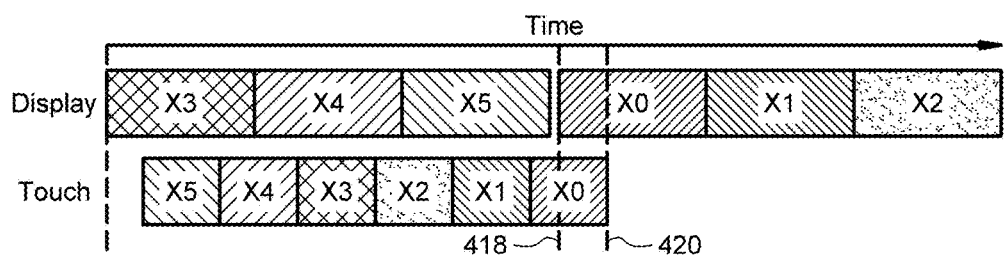
FIG. 4D illustrates an example scenario of an expected interference where the display controller starts a second iteration of updating display screen in accordance with an embodiment.

FIG. 4D illustrates an example scenario of an expected interference where display controller 218 starts a second iteration of updating display screen 224. In the scenario illustrated in FIG. 4D, an expected interference could occur because touch sensor controller 12 scans section X0 of touch-sensitive area 216 during the same time period that display controller 218 updates section X0 of display screen 224. The interference corresponds to the time area between dashed line 418 and dashed line 420.

Figure 5A:
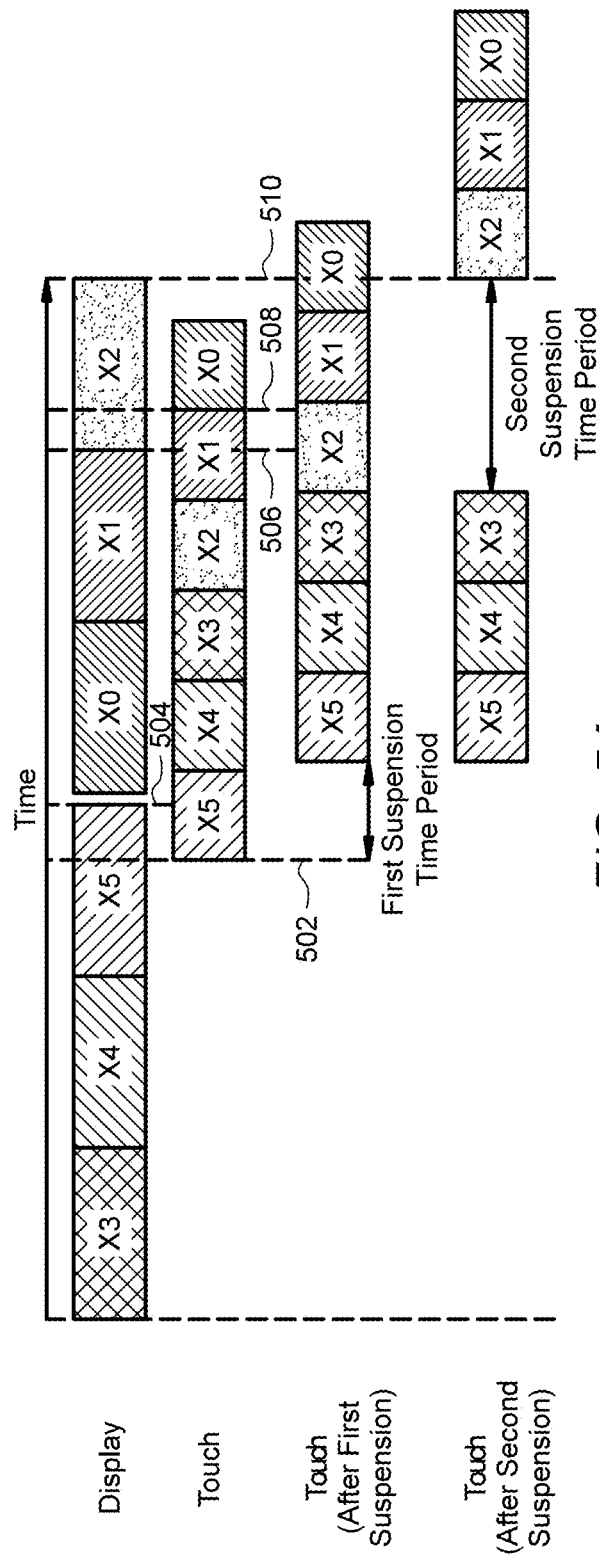
FIG. 5A illustrates a first example scenario where touch sensor controller implements an asynchronous touch scanning process to avoid display interference in accordance with an embodiment.
Figure 5B:
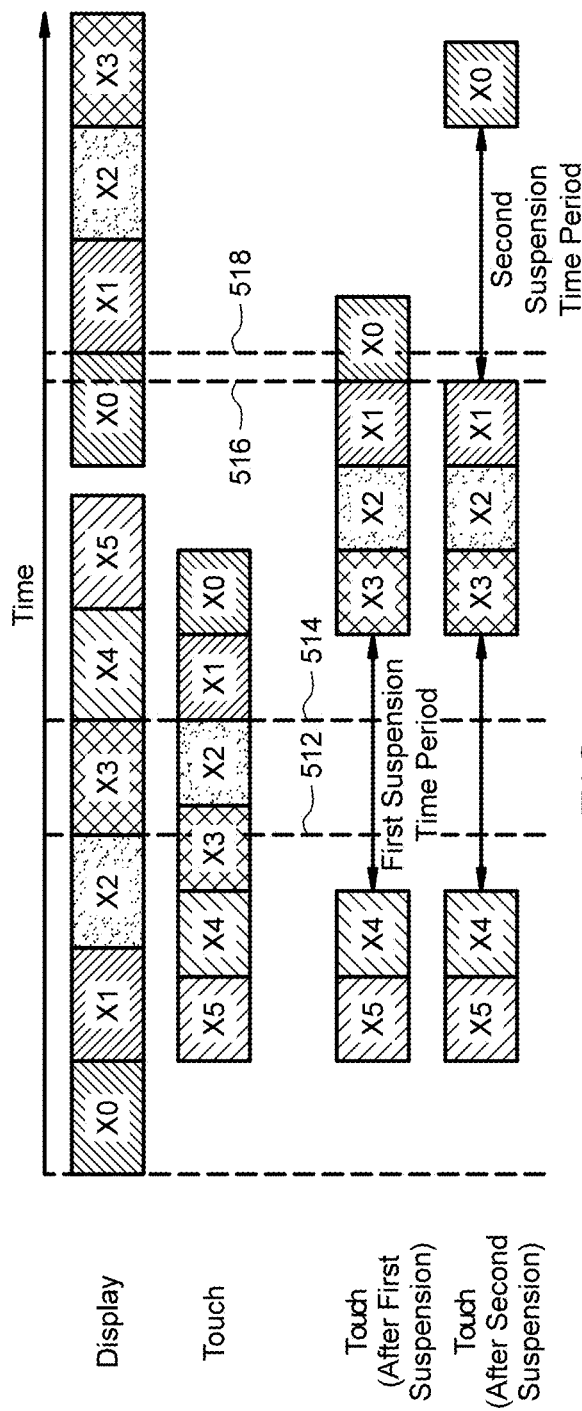
FIG. 5B illustrates a second example scenario where touch sensor controller implements an asynchronous touch scanning process to avoid display interference in accordance with an embodiment.

FIGS. 5A-5B illustrate example scenarios where touch sensor controller 12 employs an asynchronous touch scanning process to avoid display interference.

FIGS. 5A-5B use the indicators X0-X5 to indicate a section of (1) display screen 224 being updated or (2) touch-sensitive area 216 being scanned. Indicators X0-X5 correspond to the sections X0-X5 in FIG. 3. As indicated in the graph axes in FIGS. 5A-5B, the X-axis indicates time and the length of the boxes indicates the time period that the respective section of (1) display screen 224 is being updated or (2) touch-sensitive area 216 is being scanned. The Y-axis indicates whether the corresponding box indicates that the box is indicating that the section of (1) display screen 224 is being updated or (2) touch-sensitive area 216 is being scanned, as labeled respectively. Moreover, the Y-axis indicates whether the corresponding boxes are after touch sensor controller 12 suspends the scanning of touch-sensitive area 216. Although FIGS. 5A-5B illustrate an example embodiment wherein touch sensor controller 12 scans the sections in touch-sensitive area 216 in an order that is reverse to the order that display controller updates the sections in display screen 224, one would understand that touch sensor controller 12 can scan the sections in touch-sensitive area 216 in any order. Likewise, one would understand that display controller 218 can update the sections in display screen 224 in any order.

In the scenario illustrated in FIG. 5A, an interference could potentially occur because touch sensor controller 12 scans section X5 of touch-sensitive area 216 during the same time period that display controller 218 updates section X5 of display screen 224. The expected interference is expected to occur between dashed line 502 and dashed line 504. To avoid this interference, touch sensor controller 12 suspends scanning for a first time period such that touch sensor controller 12 does not scan section X5 during the same time period that display controller 218 updates section X5 of display screen 224. In this scenario, because the scan of section X5 is the start of the scan of touch-sensitive area 216, touch sensor controller 12 suspends the start of the scan.

After suspending the scan for a first time period, a second interference could potentially occur because now touch sensor controller 12 scans section X2 of touch-sensitive area 216 during the same time period that display controller 218 updates section X2 of display screen 224. As illustrated, the second expected interference is expected to occur between dashed line 506 and dashed line 508. To avoid this second interference, touch sensor controller 12 suspends scanning for a second time period such that touch sensor controller 12 does not scan section X2 during the same time period that display controller 218 update section X2 of display screen 224. For example, touch sensor controller 12 suspends scanning for a second time period and then resume scanning of section X2 after dashed line 510 in order to avoid interfering with display controller 218 updating display screen 224.

In the scenario illustrated in FIG. 5B, an interference could potentially occur because touch sensor controller 12 scans section X3 of touch-sensitive area 216 during the same time period that display controller 218 updates section X3 of display screen 224. As illustrated, the expected interference is expected to occur between dashed line 512 and dashed line 514. This expected interference is similar to expected interference identified in FIG. 4B. To avoid this interference, touch sensor controller 12 suspends scanning for a first time period such that touch sensor controller 12 does not scan section X3 during the same time period that display controller 218 updates section X3 of display screen 224.

After suspending the scan for a first time period, a second interference could potentially occur because now touch sensor controller 12 scans section X0 of touch-sensitive area 216 during the same time period that display controller 218 updates section X0 of display screen 224. The expected second interference is expected to occur between dashed line 516 and dashed line 518. This expected interference is similar to expected interference identified in FIG. 4C. To avoid this second interference, touch sensor controller 12 suspends scanning for a second time period such that touch sensor controller 12 does not scan section X0 during the same time period that display controller 218 update section X0 of display screen 224.

Although the example scenarios illustrate two expected interferences occurring and touch sensor controller 28 suspending for two separate time periods, the disclosure incorporates touch sensor controller 12 identifying any number of expected interferences and determining any number of associated suspension time periods. For example, touch sensor controller 28 may suspend scanning touch sensor 10 for two separate time periods before display controller 218 completes an iteration of updating display screen 224. Moreover, touch sensor controller 12 is configured to adjust the length of the suspension time period for each expected interference.

Figure 6:
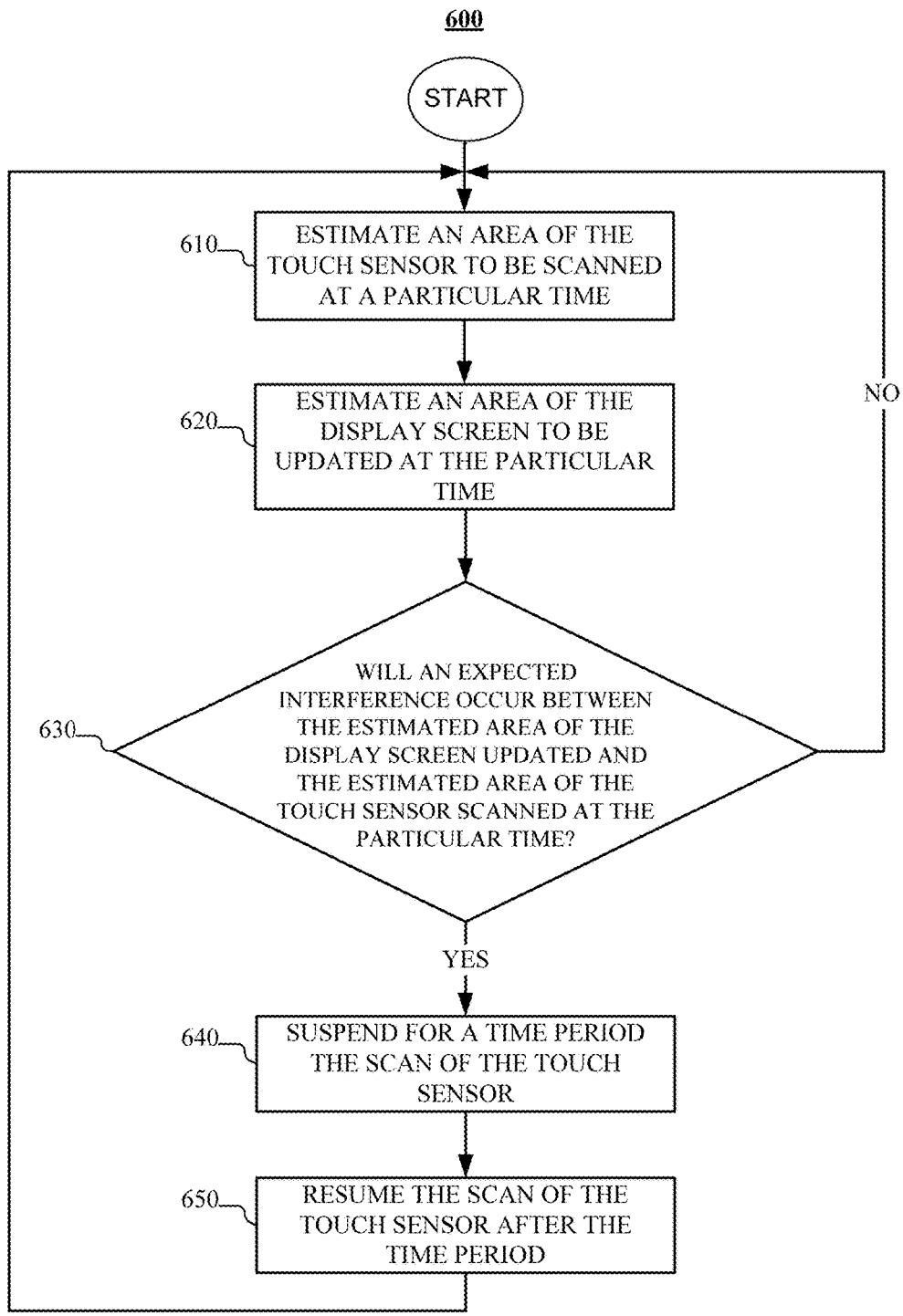
FIG. 6 illustrates an example method for introducing an asynchronous scanning process to avoid display interference in accordance with an embodiment.

FIG. 6 illustrates an example method for introducing an asynchronous scanning process to avoid display interference.

The method 600 starts at step 610, where touch sensor controller 12 estimates an area of the touch-sensitive area 216 of touch sensor 10 that touch sensor controller 12 is expected to scan at a particular time. At step 620, touch sensor controller 12 estimates an area of display screen 224 that display controller 218 is expected to update at the particular time.

At step 630, touch sensor controller 12 determines whether an expected interference will occur between the estimated area of display screen 224 that display controller 218 will update and the estimated area of the touch-sensitive area 216 of touch sensor 10 that touch sensor controller 12 is expected to scan at that particular time. In an example embodiment, touch sensor controller 12 determines an expected interference by comparing the estimated area of display screen 224 that display controller 218 will update and the estimated area of the touch-sensitive area 216 of touch sensor 10 that touch sensor controller 12 is expected to scan at that particular time.

As an example of an expected interference, touch sensor controller 12 determines whether a neighboring area that touch sensor controller 12 is scanning may create noise for the area being updated by display controller 218. If touch sensor controller 12 determines that a neighboring area being scanned may interfere with the area being updated by display controller 218, touch sensor controller 12 suspends scanning until the interference is avoided.

If an expected interference will not occur at the particular time, the method proceeds to step 610 and touch sensor controller will estimate the area of touch sensor 10 to be scanned and the area of display screen 224 to be updated at a different time. If, however, an expected interference will occur at the particular time, the method proceeds to step 640.

At step 640, touch sensor controller 12 may suspend scanning touch sensor 10 for a time period on or before the first time. In certain embodiments, the suspension time period is a set time period. In an example embodiment, the length of the suspension time period is adaptive. For example, the length of the suspension time period may vary based on the amount of time the interference was expected to have occurred. In addition, during the suspension time period, touch sensor controller 12 may suspend any scanning of any portion of the touch sensitive area. In certain embodiments, during the suspension time period, touch sensor controller 12 scans a portion of the touch-sensitive area that does not collide with the area that display controller 218 is updating during that time period. Touch sensor controller 12 resumes the scan of touch sensor 10 after the time period at step 650.

Touch sensor controller 12 may continuously identify expected interferences between the estimated area of display screen 224 that display controller 218 will update and the estimated area of the touch-sensitive area 216 of touch sensor 10 that touch sensor controller 12 is expected to scan at a particular time. For example, touch sensor controller 12 determines whether a second expected interference between the update of display screen 224 by display controller 218 and the scan of touch-sensitive area 216 may occur at a second time. Touch sensor controller 12 estimates a second area that display controller 218 will update at a second time. Touch sensor controller 12 also determines a second area that touch sensor controller 12 is expected to scan at the second time. By comparing the estimated second area that display controller 218 will update and the estimated second area that touch sensor controller 12 is expected to scan at the second time, touch sensor controller 12 determines a second expected interference between the update of the estimated area of display screen 224 by display controller 218 at the second time and the scan of the estimated area of touch-sensitive area 216 by the touch sensor controller 12 at the second time. If touch sensor controller 12 determines that a second expected interference between the update of display screen 224 and scan of touch-sensitive area 216 may occur, touch sensor controller 12 suspends scanning the touch-sensitive area for a second time period on or before the second time.

Although this disclosure describes and illustrates particular steps of the method of FIG. 6 as occurring in a particular order, it is noted that the present technology is not limited to these example steps. One embodiment may repeat one or more steps of the method of FIG. 6. Moreover, although this disclosure describes and illustrates an example method for introducing an asynchronous scanning process to avoid display interference including the particular steps of the method of FIG. 6, it is noted that the present technology is not limited to these example steps, and that other methods may be implemented, which may include all, some, or none of the steps of the method of FIG. 6. Moreover, although this disclosure describes and illustrates particular components carrying out particular steps of the method of FIG. 6, it is noted that the present technology is not limited to these example components, and that other configurations of components may be implemented.

Figure 7:
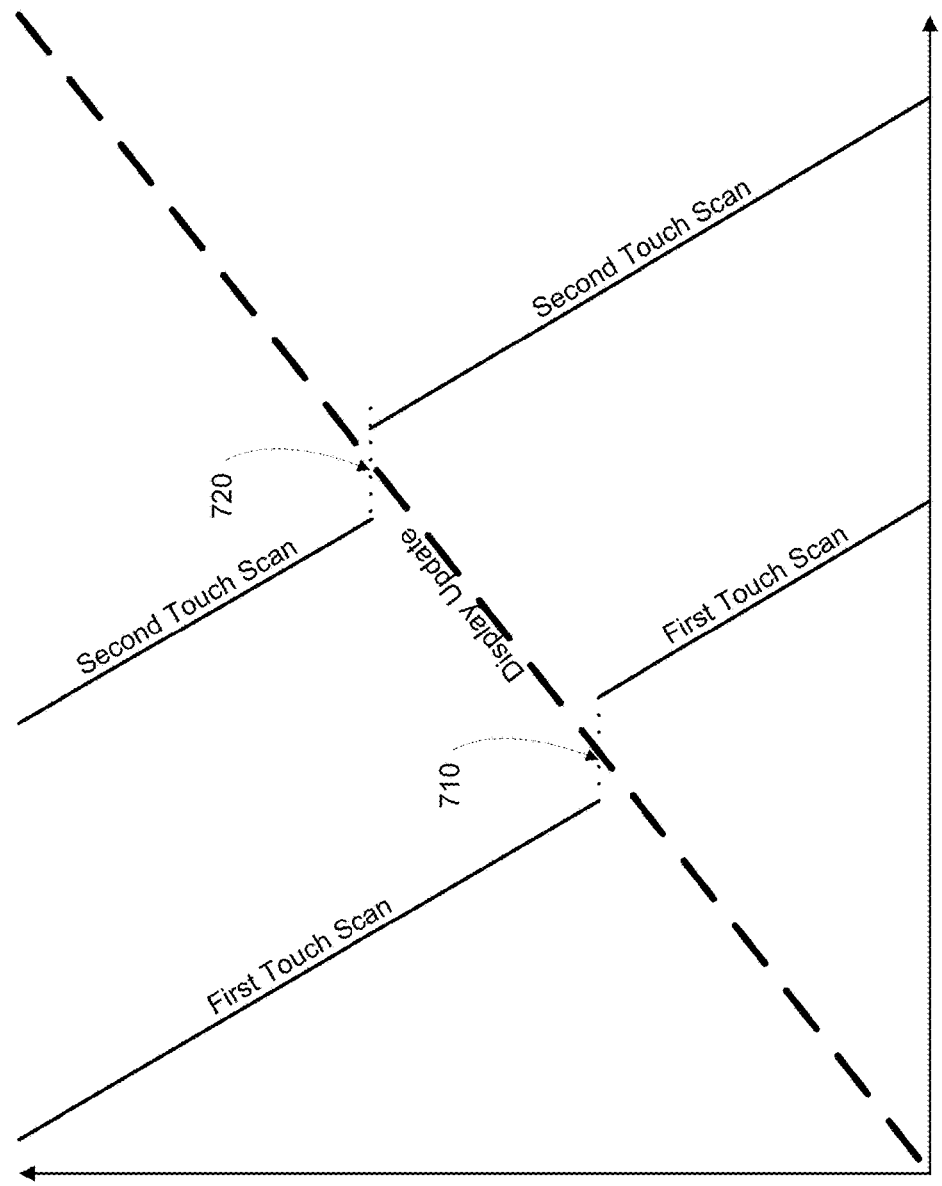
FIG. 7 illustrates an example touch scan and display update.

FIG. 7 illustrates an example touch scan and display update. In a particular embodiment, touch sensor controller 12 identifies first expected interference 710 and suspends the first touch scan such that the expected interference between the first touch scan and the display update is avoided. Similarly, touch sensor controller 12 identifies second expected interference 720 and suspends the second touch scan such that the expected interference between the second touch scan and the first touch scan is avoided.

In addition, as illustrated, first and second touch scan is accomplished in the reverse direction of the display update. In certain embodiments, reversing the direction of the touch scan in relation to the direction of the display update may minimize the interaction between the touch scan and the display update. In addition, reversing the direction of the touch scan to the direction of the display update may also minimize the length of suspension time period used to suspend scanning touch-sensitive area 216 in order to avoid interference with the display update.

Figure 8:
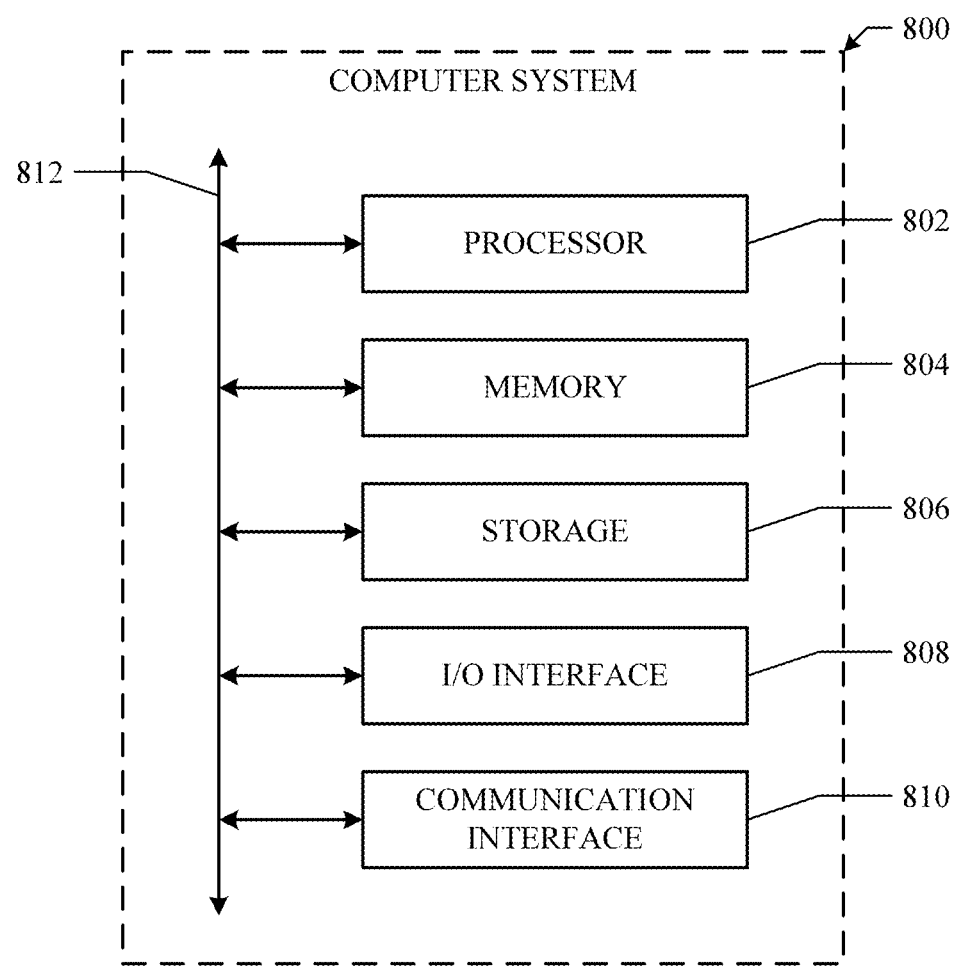
FIG. 8 illustrates an example computer system in accordance with an embodiment.

FIG. 8 illustrates an example computer system 800 for use with display-integrated touch sensors 200 as described herein. For example, computer system 800 can be a laptop or mobile phone that integrates display-integrated touch sensors 200. In particular embodiments, one or more computer systems 70 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. In particular embodiments, the software running on one or more computer systems 800 may be logic encoded on a computer readable medium. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as, for example, those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 802. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 504 or storage 506 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 502 may include one or more internal registers for data, instructions, or addresses. This disclosure contemplates processor 802 including any suitable number of any suitable internal registers, where appropriate. Where appropriate, processor 802 may include an FPGA; one or more arithmetic logic units (ALUs); be a multi-core processor; or include one or more processors 72. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile or non-volatile memory. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 806 may include one or more storage control units facilitating communication between processor 802 and storage 806, where appropriate. Where appropriate, storage 506 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 508 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as, for example, a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor controller, comprising:
a processor unit; and
a memory unit communicatively coupled to the processor unit, the memory unit storing logic configured to, when executed by the processor unit, cause the touch sensor controller to:
suspend for a first time period, based on an expected interference between a scan of a touch-sensitive area of a touch sensor for touch events and an update of a display screen, the scan of the touch-sensitive area of the touch sensor for touch events; and
resume the scan after the first time period;
wherein the scan of the touch-sensitive area of the touch sensor comprises scanning one or more drive lines in a plurality of drive lines of the touch-sensitive area in a scanning order that is reverse to an update order that a display controller updates one or more pixel lines in a plurality of pixel lines of the display screen.

2. The touch sensor controller of claim 1, wherein the logic is further configured to, when executed by the processor, cause the processor to:
estimate an area of the display screen that the display controller will update at a first time;
estimate an area of the touch sensor that a touch sensor controller is expected to scan at the first time; and
identify the expected interference based on a comparison between the update of the estimated area of the display screen by the display controller at the first time and the scan of the estimated area of the touch sensor by the touch sensor controller at the first time.

3. The touch sensor controller of claim 2, wherein the logic is further configured to, when executed by the processor, cause the processor to:
estimate a second area that the display controller will scan at a second time, the second time occurring after the first time;
estimate a second area that the touch sensor controller is expected to scan at the second time;
identify a second expected interference based on a comparison between the update of the estimated second area by the display controller at the second time and the scan of the estimated second area by the touch sensor controller at the second time; and
suspend for a second time period the scan of the touch sensitive area of the touch sensor for touch events based on the second expected interference.

4. The touch sensor controller of claim 2, wherein estimating an area that the display controller will update at a first time comprises estimating an area that the display controller will update at a first time based on a frame refresh rate of the display controller.

5. The touch sensor controller of claim 4, wherein the logic is further configured to, when executed by the processor, cause the processor to calculate the first time period based on the frame refresh rate.

6. The touch sensor controller of claim 1, wherein suspending for the first time period a scan of a touch sensitive area of a touch sensor for touch events comprises suspending for the first time period driving of drive electrodes in the touch sensitive area of the touch sensor.

7. A method, comprising:
suspending, by a touch sensor controller, a scan of a touch sensitive area of a touch sensor for touch events based on an expected interference between the scan and an update of a display screen; and
resuming, by the touch sensor controller, the scan after the first time period;
wherein the scan of the touch-sensitive area of the touch sensor comprises scanning one or more drive lines in a plurality of drive lines of the touch-sensitive area in a scanning order that is reverse to an update order that a display controller updates one or more pixel lines in a plurality of pixel lines of the display screen.

8. The method of claim 7, further comprising:
estimating, by the touch sensor controller, an area of the display screen that the display controller will update at a first time;
estimating, by the touch sensor controller, an area of the touch sensor that a touch sensor controller is expected to scan at the first time; and
identifying, by the touch sensor controller, the expected interference based on a comparison between the update of the estimated area of the display screen by the display controller at the first time and the scan of the estimated area of the touch sensor by the touch sensor controller at the first time.

9. The method of claim 8, further comprising:
estimating, by the touch sensor controller, a second area that the display controller will scan at a second time, the second time occurring after the first time;
estimating, by the touch sensor controller, a second area that the touch sensor controller is expected to scan at the second time;
identifying, by the touch sensor controller, a second expected interference based on a comparison between the update of the estimated second area by the display controller at the second time and the scan of the estimated second area by the touch sensor controller at the second time; and
suspending, by the touch sensor controller, for a second time period the scan of the touch sensitive area of the touch sensor for touch events based on the second expected interference.

10. The method of claim 8, wherein estimating an area that the display controller will update at a first time comprises estimating an area that the display controller will update at a first time based on a frame refresh rate of the display controller.

11. The method of claim 10, further comprising calculating the first time period based on the frame refresh rate.

12. The method of claim 7, wherein suspending for the first time period a scan of a touch sensitive area of a touch sensor for touch events comprises suspending for the first time period driving of drive electrodes in the touch sensitive area of the touch sensor.

13. A non-transitory computer readable medium comprising logic operable, when executed by a processor, to:
suspend for a first time period, based on an expected interference between a scan of a touch sensitive area of a touch sensor for touch events and an update of a display screen, the scan of the touch sensitive area of the touch sensor for touch events; and
resume the scan after the first time period;
wherein the scan of the touch-sensitive area of the touch sensor comprises scanning one or more drive lines in a plurality of drive lines of the touch-sensitive area in a scanning order that is reverse to an update order that a display controller updates one or more pixel lines in a plurality of pixel lines of the display screen.

14. The non-transitory computer readable medium of claim 13, wherein the logic is further operable to:
estimate an area of the display screen that the display controller will update at a first time;
estimate an area of the touch sensor that a touch sensor controller is expected to scan at the first time; and
identify the expected interference based on a comparison between the update of the estimated area of the display screen by the display controller at the first time and the scan of the estimated area of the touch sensor by the touch sensor controller at the first time.

15. The non-transitory computer readable medium of claim 14, wherein the logic is further operable to:
estimate a second area that the display controller will scan at a second time, the second time occurring after the first time;
estimate a second area that the touch sensor controller is expected to scan at the second time;
identify a second expected interference based on a comparison between the update of the estimated second area by the display controller at the second time and the scan of the estimated second area by the touch sensor controller at the second time; and
suspend for a second time period the scan of the touch sensitive area of the touch sensor for touch events based on the second expected interference.

16. The non-transitory computer readable medium of claim 13, wherein suspending for the first time period a scan of a touch sensitive area of a touch sensor for touch events comprises suspending for the first time period driving of drive electrodes in the touch sensitive area of the touch sensor.

* * * * *